UNITED STATES PATENT OFFICE.

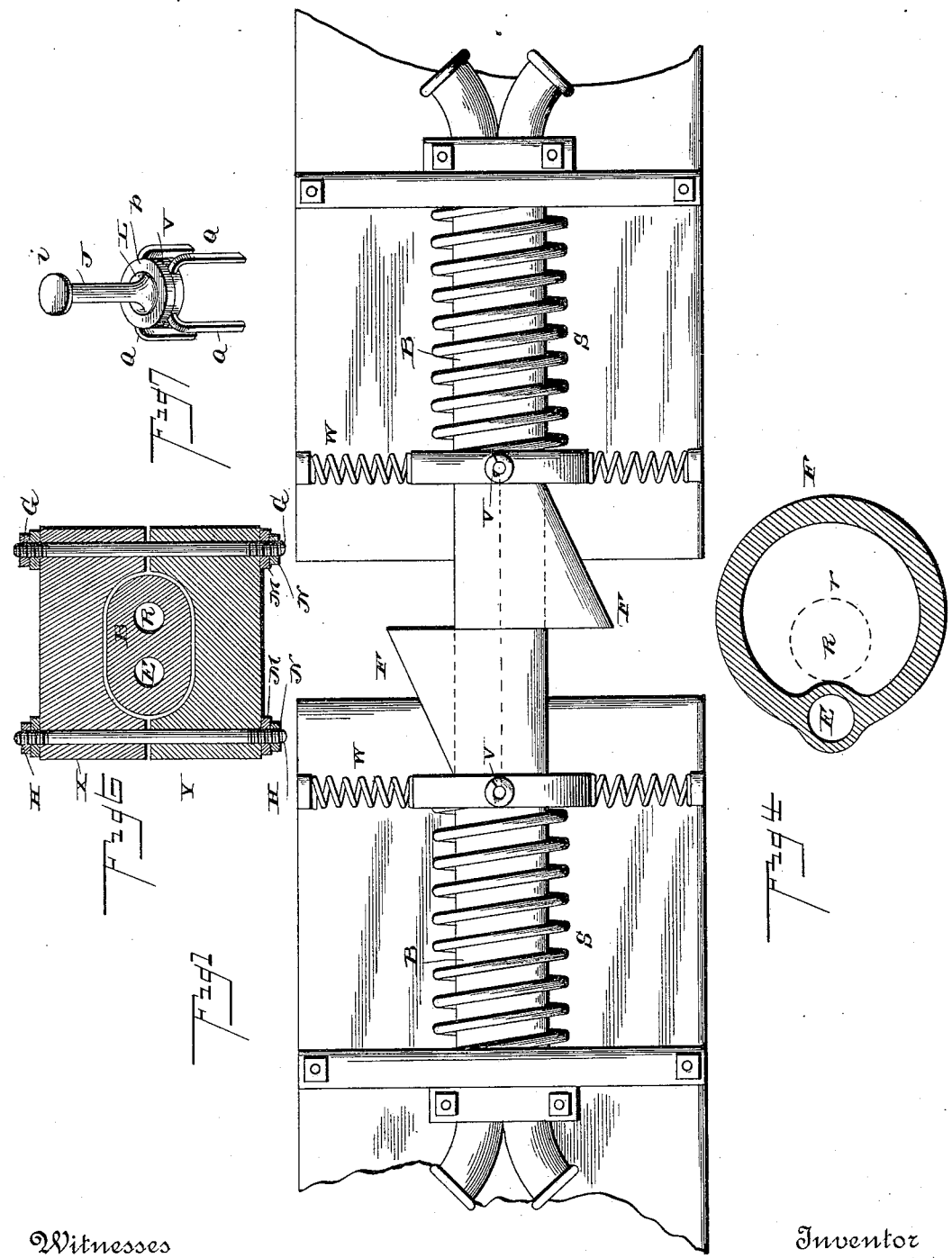

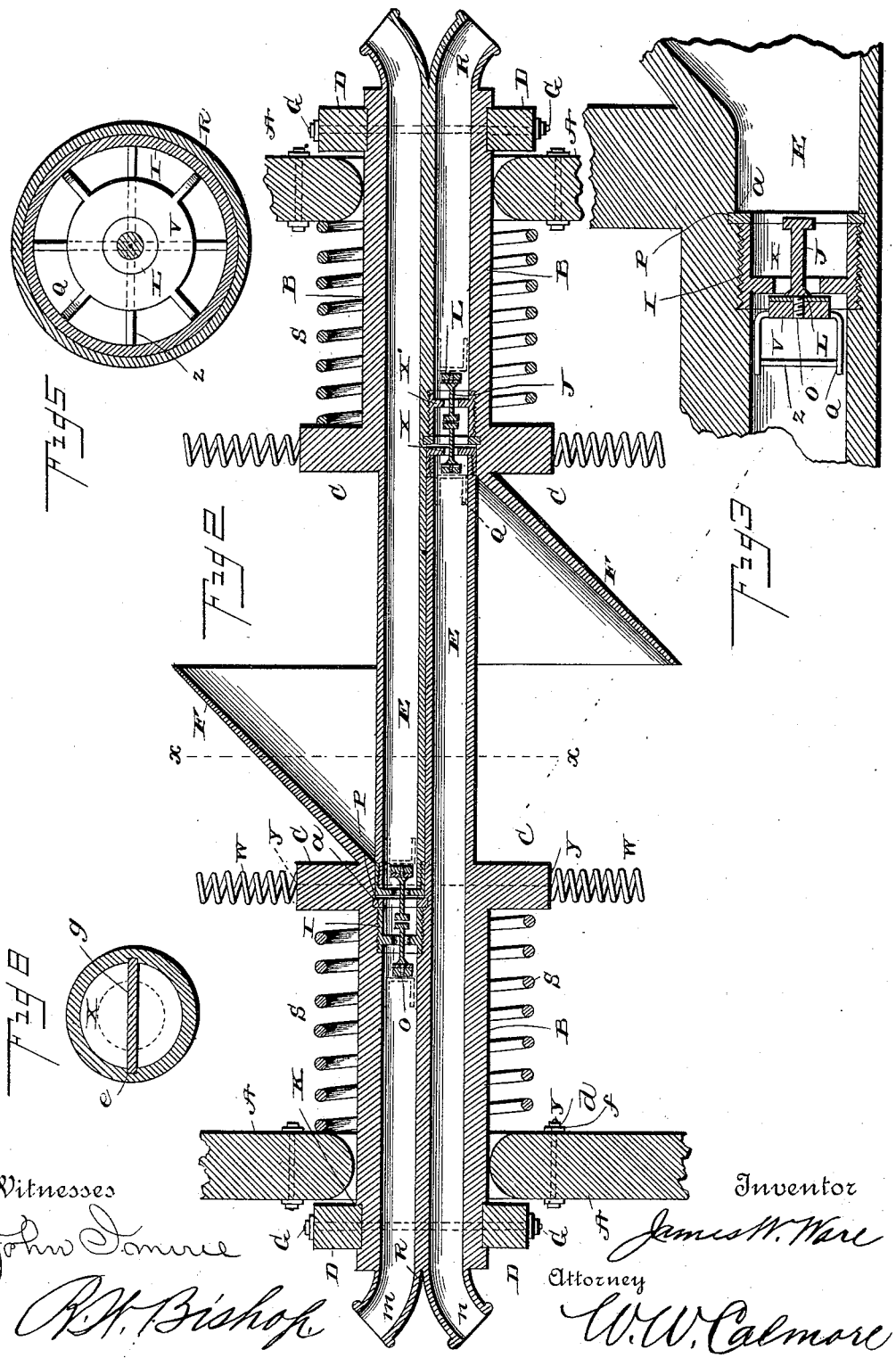

JAMES W. WARE, OF CAPE MAY, NEW JERSEY, ASSIGNOR OF ONE-HALF TO J. STRATON WARE, OF SAME PLACE.

AUTOMATIC PIPE-COUPLING FOR RAILROAD-CARS.

SPECIFICATION forming part of Letters Patent No. 464,536, dated December 8, 1891.

Application filed December 24, 1890. Serial No. 375,764. (No model.)

*To all whom it may concern:*

Be it known that I, JAMES W. WARE, a citizen of the United States, residing at Cape May city, in the county of Cape May and State of New Jersey, have invented certain new and useful Improvements in Automatic Pipe-Couplings for Railroad-Cars, of which the following is a specification, reference being had therein to the accompanying drawings.

My invention relates to improvements in automatic couplings for the steam-heating pipes of railroad-cars; and it consists in certain novel features hereinafter described and claimed.

The objects of my invention are to produce a pipe-coupling of a simple construction that will be automatic in its operation and to provide means for preventing the displacement of the valve. I attain these objects by the mechanism illustrated in the following drawings, in which—

Figure 1 is a bottom plan view of the ends of two cars coupled together and provided with my improvements. Fig. 2 is a longitudinal section showing the two members coupled. Fig. 3 is a detail longitudinal section of one member. Fig. 4 is a transverse section on line $x$ $x$ of Fig. 2, and Fig. 5 is a similar view taken on the line $y$ $y$ of Fig. 2. Fig. 6 is a detail section showing the construction of the rear collar. Fig. 7 is a detail perspective view of the valve. Fig. 8 is a view of the segment and the key for operating the same.

Similar letters refer to similar parts throughout the several views.

The body B, front collar C, receiving bowl or funnel F, together with the receiving-tube R and entering tube E, form the body of the device. S is a powerful spring surrounding the body B, with front bearings against the collar C and back bearings against the spring-brace A. The back collar D is sunk into a groove K, surrounding the body B behind the spring-brace A.

The funnel F and entering tube E are shown in transverse vertical section in Fig. 4, in which the broken line $r$ indicates the mouth of the receiving-tube.

The relation of the collar C to the receiving-tube R and entering tube E and side springs W is shown in Figs. 1 and 2, showing also an upper spring U.

The collar D and body B are shown in transverse vertical section in Fig. 6, in which $x$ and $y$ are respectively the upper and lower segments of the back collar D, held together by the bolts G, having screw ends H, about which are fitted nuts N upon washers M.

The valve shown in detail in Fig. 7 is composed of a head $i$, shaft J, with a flange L, and screw end O, that fits into the valve-plate V, surmounted by a rubber disk $p$ and having extending from its edge four equidistant radii Q, which reach the wall of the tube and then turn down at right angles and run down close to it for a distance greater than the maximum play of the valve.

Z Z are fixed cross bars or pins upon the inner side of the tubes, upon which rests the valve-plate V when not in use.

I is the annular segment of the receiving-tube R, surmounted by a rubber ring or buffer P, and $e$ is the entering-tube cap.

I will now more fully describe my invention as applied to air or steam brakes on railroad-cars, but do not limit myself to that use, as it can be applied to other uses with equal advantage or with a single tube or increased number of tubes. The coupling of this device attached to one car, with a similar one affixed to another car, is secured by the reception of the projecting extremity of the entering tube E by the funnel F, which guides it into the open end of the receiving-tube R at the cone of the funnel, where it is of sufficient caliber to admit the end of the entering tube until it impinges upon the rubber cushion P, thus forming an air-tight chamber in which the valve-rods J and their heads $i$ are confined, as in Fig. 2, while the cars are coupled. When the mechanism is not in use, the valve may occupy any indifferent place between the projecting edges $x$ and $x'$ of the annular segment I or tube-cap E, respectively, and the cross-bars Z Z. When in use, but uncoupled, as at the back of the last car of a train, the pressure within the tubes forces the rubber disk P, which rests upon the valve-disk V, against the projecting edges $x$ and $x'$, thus preventing the escape of the gas or vapor under pressure.

In making connection during the act of coupling the entering tube E reaches the receiving-tube R before the valve-rod heads $i$ $i$ meet and by forcing each other back establishes communication between the two tubes. Should there be no pressure in one of the two connecting-tubes during the coupling process, the valve of the tube in which there is no pressure will be forced back against the cross-rods Z Z and, resting against them, force back the opposing valve, and thus establish the connection between the two tubes, as in Fig. 2. The distance between the cross-bars Z Z of the entering and receiving tubes is so regulated that when the coupling is complete there will be a small play of both valves to and fro, even allowing for compression of the rubber ring or buffer P, so as to have no greater pressure upon them than that which is necessary to overcome the force in the tubes behind the valve during the first part of the act of coupling. The right-angled radii Q run up and down against the wall of the containing-tube and prevent the valve from tilting, and they are of sufficient length to extend past the cross-bars Z Z when the valve is forced against the ends $x$ and $x'$ of the tubes, thus avoiding the possibility of the ends of the radii Q catching against the cross-bars Z Z, as they would do if not sufficiently long. The annular segment I is introduced and removed by means of a flat key $q$, fitting into grooves $l$ $l$ on the inner side of the piece I, with which it is screwed in or out. The rubber ring or cushion P rests upon the front or outer edge of the piece I and is secured by being received into the recess $a$ of the body B.

The device is supported from above by resting in an opening of the spring-brace A, within which it fits loosely and moves freely about in all directions—up or down, from side to side, or to and fro. The brace A is supported from behind by means of braces $c$, secured by bolts $d$ and washers $f$.

The spring S, surrounding the body B and having a flat bearing on the adjacent face of the brace A, forces the entire device forward until stopped by the impinging of the back collar D against the brace A. The length of the body B and the strength of the spring S are so regulated that when the cars and tubes are coupled the entire device is carried backward through the opening in the brace A, so that the entire force of the compressed spring S is exerted upon the juncture of the entering tube E with the ring or buffer P with sufficient power to overcome the highest possible pressure within the tubes, though the cars may be separated the maximum distance while coupled. The force of the spring is further adjusted so that while at rest with the brace against the back collar D it holds the flat surfaces of the collar D and brace A together with sufficient force to maintain the tubes in a horizontal position. The elevation of the end of the entering tube E and its lateral adjustment is regulated by means of an adjustable spring U, attached to the top of the front collar C, and two adjustable springs W W, attached to the sides of the collar C. The rear ends of the tubes R and E diverge laterally and have flange ends for the attachment of rubber tubing of sufficient length to permit the free play of the device through the opening in the brace A.

I do not abandon or dedicate to the public any patentable feature set forth herein and not hereinafter claimed, but reserve the right to claim the same either in a reissue of any patent that may be granted upon this application or in other application for Letters Patent that I may make.

Having thus described my invention, I claim as new and desire to secure by Letters Patent—

1. The combination, with the pipe having internal transverse rods, of the valve mounted therein and having arms extending radially outward to the walls of the pipe and then longitudinally along the same beyond the transverse rods.

2. The combination, with the valve-rod J and head $i$, of the flange L for holding the rubber disk $p$, the threaded rod O, screwed into the valve-disk V, and the right-angled radii Q Q, together with the cross-bars Z Z, with the annular segment I and tube-cap E, substantially as herein shown and described, whereby the said valve and cross-bars, together with the tube ring and cap, will prevent the escape of gas or vapor under pressure when not connected, and which will prevent the valve-disks from receding within the tube beyond the cross-bars Z Z, as set forth.

3. The combination of the body B, having the tube R and the annular recess $a$, the buffer P, fitted in said recess, the segment I, secured in the end of the tube R and bearing against the buffer and provided with an internal projection $x$, the valve mounted in said projection, the tube E, the cap on the end of the said tube having an internal projection, and the valve mounted in said projection.

JAMES W. WARE.

Witnesses:
S. H. P. LEUF,
JENNIE W. LEUF.